Dec. 28, 1943. A. L. FREEDLANDER 2,337,985
METHOD OF MANUFACTURING BELTS
Original Filed April 12, 1941   3 Sheets-Sheet 1
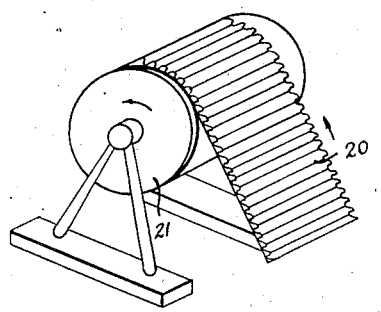
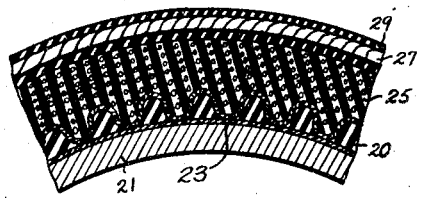
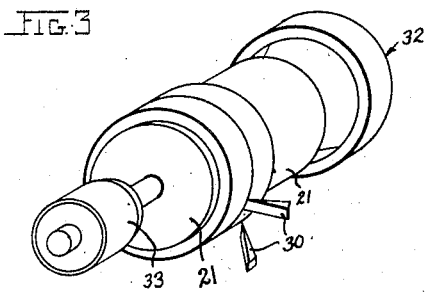
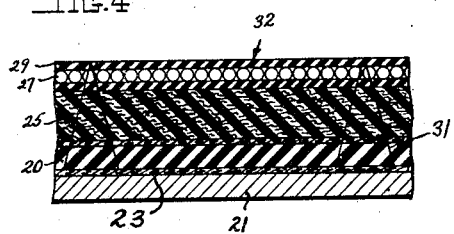
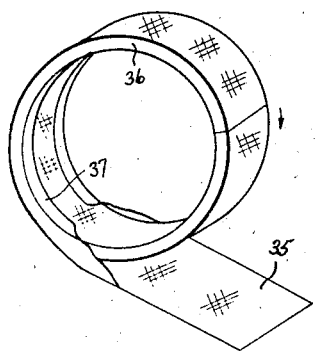
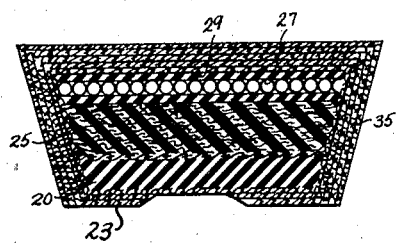
INVENTOR
ABRAHAM L. FREEDLANDER
BY
ATTORNEYS Dec. 28, 1943.     A. L. FREEDLANDER     2,337,985
METHOD OF MANUFACTURING BELTS
Original Filed April 12, 1941    3 Sheets-Sheet 2

INVENTOR
ABRAHAM L. FREEDLANDER
BY
ATTORNEYS

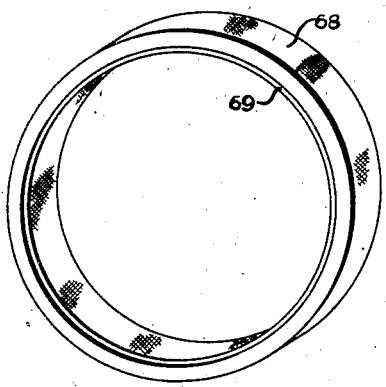
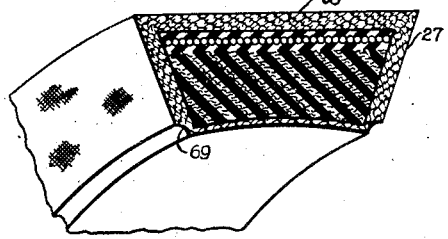
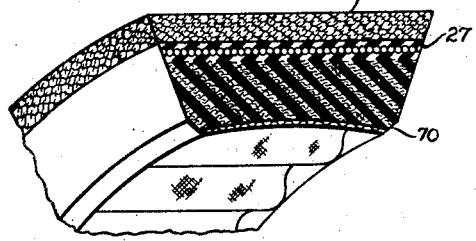
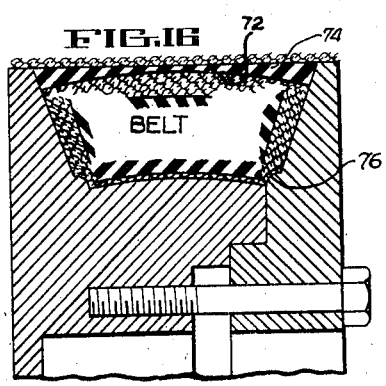
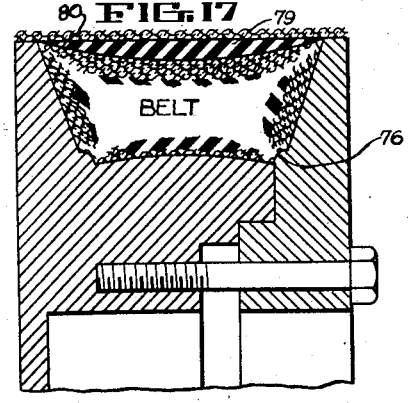
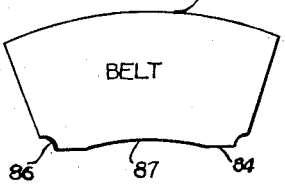

Patented Dec. 28, 1943

2,337,985

UNITED STATES PATENT OFFICE 2,337,985

METHOD OF MANUFACTURING BELTS

Abraham L. Freedlander, Dayton, Ohio, assignor to The Dayton Rubber Manufacturing Company, Dayton, Ohio, a corporation of Ohio Original application April 12, 1941, Serial No. 388,212. Divided and this application April 20, 1942, Serial No. 439,699

6 Claims. (Cl. 154—4)

This invention relates to improvements in belts and their method of manufacture.

The principal object of this invention is to provide a belt wherein the bottom edge portions along the sides of the belt are relieved, or pressed inward, to eliminate friction action at the lower exposed ends of the belt wrapper against the pulley flanges tending to separate the rubberized fabric forming the cover shortening the life of the belt.

Another object is to provide an improved wrapped belt wherein the end portions of the cover or wrapper are crimped together in the form of a groove to prevent scuffing or pushing apart of the fabric layers of the cover as the belt passes between the flanges of a pulley.

Another object is to make a wrapped cog belt wherein the cogs or toothed portion comprises either the outer or inner side of the belt and wherein the belt is molded so as to compress the exposed edges of the cover together along the sides of the belt body forming circumferential grooves producing a flexible belt having increased resistance to wear.

Another object is to provide an improved flexible cog or plain belt wherein the cords forming the neutral axis section of the belt are protected at the sides by one or more superimposed plies of rubberized fabric.

It is another object to provide a wrapped cog belt having circumferential grooves molded in the belt along the inner bottom side edges which contract and firmly anchor the lower ends of the wrapper to the side walls of the belt.

Another object is to construct a cog belt having a wrapper covering three sides of the belt which is molded so as to eliminate the corner or edges along the inner or bottom side portions whereby a belt of improved resistance to wear is produced.

Another object is to construct belts of the molded cog, raw edge or plain type wherein the inner edge at opposite sides of the belt is eliminated forming a groove or depressed area which extends circumferentially of the belt whereby the belt is not subjected to excessive pressure at these edge portions during use.

Another object is to provide an improved method of making a belt of the desired trapezoidal shape with or without cogs wherein the bottom side edges of the belt are compressed inward during molding and curing of the belt producing an inwardly curved area extending circumferentially around the inner side edges of the belt. In this way, the belt is shaped so that the lower exposed edges of the belt wrapper are not subjected to the rubbing action of the pulley during use.

Other objects and advantages will become apparent from the description given hereinafter taken in connection with the drawings, wherein Figure 1 illustrates diagrammatically in perspective the building up of the layers of belt material on a drum or mandrel in making the belt;

Figure 2 is an enlarged fragmentary sectional view through the built-up belt body, matrix and mandrel showing the different parts of the belt;

Figure 3 is a perspective view illustrating the cutting of the built-up belt body into belts of the desired width and shape;

Figure 4 is a fragmentary detail sectional view showing the line or path of the knives in cutting out a V-type belt from the laminated material formed on the mandrel;

Figure 5 is a perspective view illustrating the method of applying a wrapper or cover around the outer surface and sides of the cut belts;

Figure 6 is a sectional view taken through the built-up wrapped belt before it is molded and vulcanized and showing the different layers making up the belt body structure;

Figures 13 and 14 are similar views to Figures 11 and 12 illustrating a plain belt;

Figure 15 illustrates in perspective and cross section a modification of the cog belt shown in Figure 10 wherein beveled or diagonal portions are molded along the inner side bottom surface of the belt in place of a groove or concave shaped area;

Figure 16 illustrates diagrammatically the method of molding a belt so as to provide an arched outer surface and depressed side bottom edges;

Figure 17 is a similar view as Figure 16 illustrating diagrammatically the method of molding a belt so as to have a concave outer surface;

Figure 18 illustrates another modified form of a belt constructed so as to have flat portions along the inner side adjacent the side edge grooves.

Figure 7:
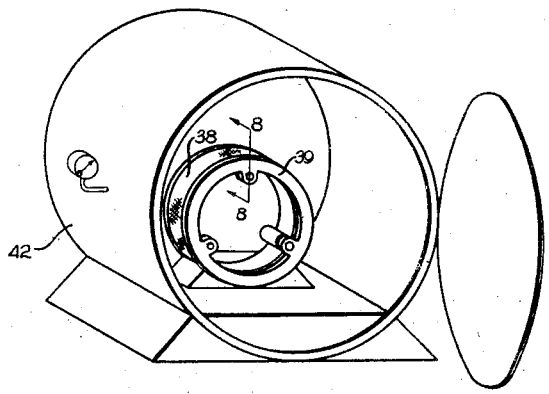
Figure 7 illustrates the step of vulcanizing the wrapped belts in a ring mold by placing the same in a curing oven or similar apparatus for heating the mold to the curing temperature.

In general, belts heretofore made, particularly of the wrapped trapezoidal type which are designed to pass over pulleys having side flanges tend to flay away or separate the rubberized fabric layers of the cover along the bottom side edge portions due to the excessive pressure and friction to which the belt is subjected along these edges. I have discovered that this difficulty can be avoided by molding the belt so as to eliminate the corners along the side bottom portions of the belt. Further, my method provides an improved way of making a wrapped cog belt so as to prevent interference between the edge of the bottom of the wrapper and the sides of the pulley whereby a long-wearing belt is produced.

This application is a division of my parent application Serial No. 388,212, filed April 12, 1941.

Referring to the drawings in detail, the method of making a wrapped cog belt is illustrated as a typical example of my invention. It is to be understood, however, that my invention is adapted for making various other types of belts, such as molded raw edge and plain belts, as well as the conventional cog belt having inner or outer cogs. Further, different shaped belts, such as illustrated in Figures 13 to 18, may be made.

In Figures 1 to 10, the steps employed in the manufacture of a wrapped cog belt according to my invention are illustrated. These steps are as follows:

Step I

A matrix is first formed by laying a plastic rubber composition (rubber composition reinforced with fine textile fibers), preferably "Stiflex," over a plate having a cog-like surface and pressing the rubber between the corrugations to form a sheet of the desired thickness. This corrugated matrix sheet 20 is partially cured so as to retain its shape and then wound on a mandrel 21 with the cog or corrugated surface portion on the outside, as shown in Figure 1. The circumference of the mandrel is somewhat less than the inside length of the finished belt due to the matrix layer which is subsequently removed. After placing the matrix layer on the mandrel the corrugated surface of the matrix is coated with material to prevent bonding with the overlaid belt body material in the usual manner. Over the matrix teeth portion is laid a base fabric layer 23. The body of the belt is built up, as shown in Figure 2, comprising the compression section 25 which consists of "Stiflex" and then a neutral axis cord layer 27 embedded in a rubber cushion layer 29. This forms the body portion of the belt without the wrapper.

Step II

As illustrated in Figure 3, this step comprises cutting the built-up belt body, shown in Figure 2, so as to provide a belt or a number of belts having the desired shape. In this instance, the knives, such as shown at 30, are set at the proper angle and held in position to cut the belt body material circumferentially of the mandrel forming belts having inclined side walls, as shown at 31 in Figure 4, producing a trapezoid shaped belt 32. During the cutting operation, the mandrel is suitably rotated as by a motor 33 and the cutting knives moved thereagainst to cut through the belt material and matrix as illustrated by the lines 31 in Figure 4. After cutting the belts to the desired shape they are removed from the mandrel and are now ready to have the outer wrapper applied thereto.

Step III

After the belt is cut to the desired shape, a wrapper 35 comprising one or more plies of bias-laid rubberized fabric is wound around the endless belt body 36, as shown in Figure 5. The cover or wrapper 35 is folded over the inner bottom edges of the belt, as shown at 37, and may be skived off to provide a smooth surface. When the desired number of plies of rubberized fabric is applied the wrapped belt body 38 is then ready for molding and vulcanizing.

Step IV

Figure 8:
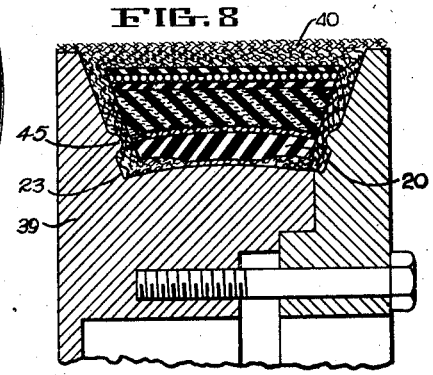
Figure 8 is an enlarged detail fragmentary section taken through the mold and belt body, substantially on line 8—8 of Figure 7, showing the corner beads and arched bottom wall construction of the ring mold for shaping the belt.

Ring molds 39 are provided for this purpose, as shown in Figures 7 and 8, and the belts are placed in the molds which are closed and rag wrapped, as at 40, to compress the belt body 38 so that it will conform to the shape of the mold. Thereafter, the ring molds are placed in a suitable vulcanizing apparatus 42, as shown in Figure 7, and heated to a vulcanizing temperature. The ring molds comprise a corner bead 45 running circumferentially around the inner side of the mold to compress the wrapper along the bottom edge sides of the belt body forming permanent circumferential grooves in the belt after it is vulcanized. In place of using ring molds, the belts may be press cured to form a similar shaped belt.

Step V

Figure 9:
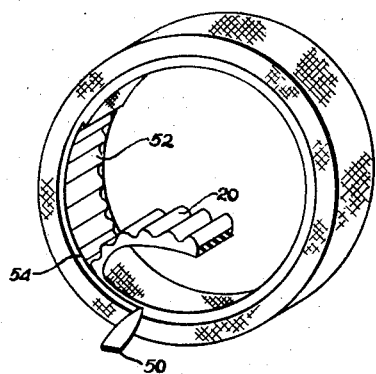
Figure 9 illustrates in perspective the method of removing the matrix from the inner surface of the belt body when making a belt having cogs along the inner surface.
Figure 10:
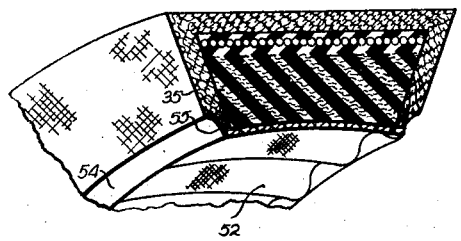
Figure 10 is a fragmentary perspective view of the finished belt including a cross section.

After vulcanization of the belt is completed the ring mold is opened and the belt removed and the corrugated matrix sheet 20 is separated from the belt by cutting the wrapper 35 along the side wall portions, as shown at 50 in Figure 9, after which the matrix is pulled away and discarded. Removal of the matrix leaves a corrugated or cog surface around the inner side of the belt, as shown at 52 in Figures 9 and 10. Along the side edges of the wrapper 35 the material is compressed and molded forming a furrow or groove 54. This unites and firmly anchors the lower free ends 35a of the wrapper, as shown at 55, and the end portions of the wrapper are vulcanized to the side walls of the cogs 52 forming an integral body. The molded belt is thus shaped to prevent rubbing of the inner corner bottom side surfaces of the belt against the pulley causing separation of the wrapper plies or layers flaying them apart necessitating repairing or replacing of the belt.

Figure 11:
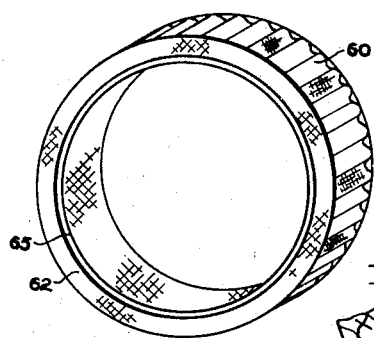
Figure 11 shows a modification wherein the cogs are formed on the outside.
Figure 12:
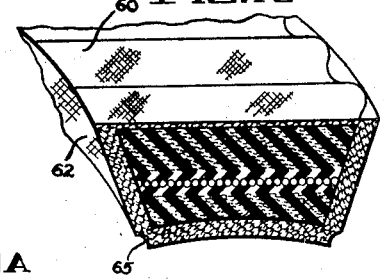
Figure 12 is a fragmentary sectional view of the wrapped cog belt of Figure 11.
Figure 10A:
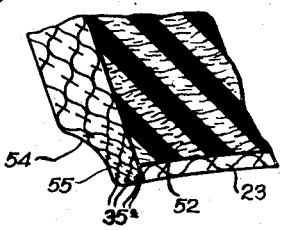
Figure 10A is an enlarged fragmentary sectional view illustrating the compressing of the lower edges of the belt wrapper fabric layers together forming a depressed area or groove.

In Figures 11 and 12 a modified cog belt is illustrated wherein the cog surface is formed on the outside of the belt, as shown at 60. In this construction a wrapper 62 is applied around the bottom or inner side surface of the belt and extends upward over the sides and is vulcanized to the outer ends of the cogs 60. A groove or relieved area is molded along the bottom side surfaces of the belt body, as shown at 65, similarly as in the making of the inner cog belt illustrated in Figures 1 to 10.

In the modification shown in Figures 13 and 14, a plain belt is formed having a flat top surface 68 and relieved bottom corner surfaces 69.

In Figure 15 a plain inner cog raw edge belt is illustrated wherein the lower bottom side portions are molded to form a beveled or diagonal shaped section 70 lying circumferentially of the belt body. This construction provides a belt which functions substantially as the circumferentially grooved belts.

In Figure 16 there is illustrated a mold for forming belts having an arched or convex shaped outer surface, as shown at 72. In this instance, a filler 74 is applied over the outer side of the belt so as to mold it in the form of an arch. The bottom side grooves 76 are molded into the belt body similarly as in Figure 8.

In Figure 17 there is illustrated a similar ring mold wherein the filler 79 is shaped so as to mold the belt so that the outer surface is concave, as illustrated at 80, with the side grooves, similarly as in Figure 16.

In the modification shown in Figure 18 a wrapped belt is formed having a convex outer surface, as shown at 82, and flat portions 84 adjacent the grooved bottom side portions 86. The inner surface portion of the belt between the flat portions is arched, as shown at 87. This construction provides a belt which is made in the same manner as described above but is merely a different shape.

It will be obvious that my invention is adapted in the manufacture of various types and shapes of belts.

The material of which the compressed section of the belt is formed which comprises "Stiflex" is generally known in the art and comprises rubber reinforced with fine, parallel, textile fibers which are disposed transversely of the belt. The transverse reinforcements in the material greatly enhance the lateral incompressibility of the belt while providing good flexibility of the compression section about a transverse axis. The presence of these fibers in the material further substantially decreases the impact of the side surfaces of the belt against the driving pulley.

Bias-laid square woven rubberized textile fabric is used in the wrapper and cog covering portion of the belt which materially increases the tensile strength of the sections because the "bias-laid" textile threads limit the extensibility and strengthen the rubber section. The wrapper of the belt may comprise any number of plies as desired. In most instances four or five plies are used but this depends upon the conditions and uses to which the belt is to be subjected. The cord layer forming the neutral axis section is wound over a rubber cushion stock 29 which is placed on the rubber "Stiflex" compression section layer, as shown in Figure 2. The cords are embedded in the rubber cushion stock as shown in the drawings.

It will be understood that the above described structure and method of making the belt is illustrative of the manner in which the principles of my invention may be utilized and that I desire to comprehend within my invention such modifications as come within the scope of the claims.

I claim:

1. An improved method of making a belt comprising placing a matrix having cogs or teeth along one side around a mandrel, building up the body of said belt on the matrix on said mandrel, cutting the built-up body and matrix circumferentially of said mandrel to provide a belt of the desired shape, and vulcanizing the same to produce a finished belt comprising a belt body having a separable matrix which on removal leaves a cog surface thereon.

2. An improved method of making cog belts comprising forming a matrix having cogs or teeth along one side, laying said matrix around a mandrel of a diameter corresponding to the size of the belt, placing a layer of rubber composition reinforced with fine textile fibers thereover, applying a cushion layer of rubber thereon, winding a cord layer section over said rubber cushion layer, cutting the built-up belt body to provide a belt of the desired shape, removing the cut belt from the mandrel and applying a wrapper of rubberized fabric therearound, placing the wrapped belt body in a mold of the desired shape, vulcanizing the belt to a unitary structure having circumferential grooves formed along the inner bottom side edges of the belt, and removing the matrix from the inner surface of the belt body to provide a finished belt having cogs along the inner surface.

3. An improved method of making a wrapped cog belt comprising forming a matrix of rubber composition having fine textile fibers embedded therein having teeth along one surface, positioning said matrix onto a mandrel of the desired diameter and applying a fabric base layer over the teeth of said matrix, placing a cushion layer of rubber thereover, winding a cord layer over said rubber cushion, cutting an endless belt from the built-up layers of the desired shape, removing the belt and applying a wrapper comprising plies of rubberized fabric over the outer surface, sides and bottom edges, placing the wrapped belt body in a mold and compressing the same into the mold so that the body of the belt conforms to the shape of the mold, vulcanizing the belt body under heat and pressure to unite the built-up layers into an integral belt body, removing the vulcanized belt from the mold, and discarding the matrix to provide a finished cog belt.

4. An improved method of making a wrapped cog belt comprising forming a matrix of rubber composition reinforced with fine textile fibers having teeth along one surface, positioning said matrix onto a mandrel of the desired diameter and applying a fabric base layer over the teeth of said matrix, placing a cushion layer of rubber over said rubber composition reinforced with fine textile fibers, applying a layer of cord over said rubber cushion layer, cutting an endless belt from the built-up layers of the desired shape, removing the belt and applying a wrapper comprising plies of rubberized fabric over the outer surface, sides and bottom edges, placing the wrapped belt body in a mold having a circumferential bead along the inner bottom corners to form circumferential grooves along the bottom inner surface of the belt body, vulcanizing the belt body to unite the built-up layers and form an integral unitary structure, and removing the matrix from the inner surface side of the belt body to provide a finished wrapped cog belt having permanent circumferential grooves along the inner edges.

5. An improved method of making a belt comprising the steps of (a) forming a matrix by pressing rubber composition on a corrugated plate, partially curing said matrix, removing the same from the plate and winding it on a mandrel so that the corrugated suface is uppermost; (b) laying over the corrugated matrix surface a rubber composition to form the compression section of the belt; (c) applying a rubber cushion layer onto said compression section; (d) winding cord over said cushion layer to form a strength section comprising cord strands embedded in rubber; (e) cutting the built-up belt body into trapezoidal shaped belts, applying a wrapper comprising bias-laid rubberized fabric over the outer surface, along the sides and over the inner bottom edges of the belt; (f) compressing the wrapped belt body in a mold to form a belt of a trapezoidal shaped cross section, said mold having a circumferential bead along the inner bottom corner surfaces to mold a corresponding groove in the belt body; and (g) vulcanizing the belt body in said mold to form an integral unitary structure having permanent circumferential grooves along the bottom inner side of the belt.

6. An improved method of making a molded wrapped cog belt comprising forming a matrix having cogs or teeth along one side, applying said matrix around a mandrel, placing a layer of rubber composition reinforced with fine textile fibers over said matrix, winding a layer of cord over said layer of rubber composition reinforced with fine textile fibers, applying a cushion layer of rubber thereon, cutting the built-up belt body to provide one or more belts of the desired cross sectional shape, removing the cut belt from the mandrel and applying a wrapper thereto of rubberized fabric, placing the wrapped belt in a mold, vulcanizing the same to produce a unitary belt body with circumferential grooves molded along the inner bottom side edges, and removing the matrix to provide a finished wrapped cog belt.

ABRAHAM L. FREEDLANDER.